United States Patent
Loh et al.

(10) Patent No.: US 6,317,539 B1
(45) Date of Patent: Nov. 13, 2001

(54) INTERLEAVED SAMPLED AND CHIRPED OPTICAL WAVEGUIDE GRATINGS FOR WDM CHANNEL OPERATIONS AND RESULTING DEVICES

(75) Inventors: Wei-Hung Loh; Feng-Qing Zhou, both of San Jose; Jing-Jong Pan, Milpitas, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/398,372

(22) Filed: Sep. 17, 1999

(51) Int. Cl.$^7$ ............................... G02B 6/34; H04J 14/02
(52) U.S. Cl. ............................... 385/37; 385/31; 385/24; 385/123; 359/127; 359/130
(58) Field of Search .................................. 385/15, 10, 27, 385/28, 31, 37, 39, 24, 123; 359/127, 130

(56) References Cited

U.S. PATENT DOCUMENTS

| | | | |
|---|---|---|---|
| 5,812,712 | * | 9/1998 | Pan .......................................... 385/37 |
| 5,974,206 | * | 10/1999 | Bricheno et al. ....................... 385/11 |
| 5,982,963 | * | 11/1999 | Feng et al. .............................. 385/37 |
| 6,122,418 | * | 9/2000 | Ellis ........................................ 385/27 |
| 6,137,924 | * | 10/2000 | Strasser et al. ......................... 385/11 |
| 6,154,588 | * | 11/2000 | Kai ......................................... 385/27 |
| 6,201,907 | * | 3/2001 | Farries ................................... 385/24 |

OTHER PUBLICATIONS

Gruner–Nielsen et al., "Design and manufacture of dispersion compensating fibre for simultaneous compensation of dispersion and dispersioin slope," *Tech. Dig. OFC* (1999) pp. 232–234.

Williams et al., "Fiber Bragg Grating Fabrication for Dispersion Slope Compensation," *IEEE Photonics Technology Letters* (1996) 8:1187–1189.

Gnauck et al., "8x20 Gb/s 315–km, 8x10 Gb/s 480–km WDM Transmission Over Conventional Fiber Using Multiple Broad–Band Fiber Gratings," *IEEE Photonics Technology Letters* (1998) 10:1495–1497.

Ibsen et al., "Sinc–Sampled Fiber Bragg Gratings for Identical Multiple Wavelength Operation," *IEEE Photonics Technology Letters* (1998) 10:842–844.

Ouellette et al., "Broadband and WDM dispersion compensation using chirped sampled fibre Bragg gratings," *Electronics Letters* (1995) 31:899–901.

Cai et al., Sampled nonlinearly–chirped fibre–Bragg–grating for the tunable dispersion compensation of many WDM channels simultaneously, *Optical Fiber Communications Conference*, 1999, Paper No. FA7–1, pp. 20–22.

* cited by examiner

*Primary Examiner*—Brian Healy
(74) *Attorney, Agent, or Firm*—Lacasse & Associates; Randy W. Lacasse; Kevin E. Greene

(57) ABSTRACT

The present invention provides for an optical waveguide device comprising a gratings, primarily in the form of fiber Bragg gratings, which are sampled, interleaved and chirped to achieve different functions. By interleaving sampled fiber Bragg gratings, each with a grating period which differs from the others by an amount corresponding to a multiple of a channel spacing, a predetermined and useful optical spectrum can be produced for the optical waveguide device. By making the sample periods for the fiber Bragg gratings different from each other, the resulting reflection spectrum has missing reflection peaks. A bandpass filter can be effectively created. Furthermore, by discretely varying the grating periods of sampled fiber Bragg gratings at intervals along the optical fiber containing the gratings, a more uniform optical spectrum is produced for the optical waveguide device. Finally, by chirping the sampling function of a sampled and chirped fiber Bragg grating, compensation for both dispersion and dispersion slope of a transmission fiber can be achieved.

44 Claims, 10 Drawing Sheets

INTERLEAVED SAMPLED AND CHIRPED OPTICAL WAVEGUIDE GRATINGS FOR WDM CHANNEL OPERATIONS AND RESULTING DEVICES

BACKGROUND OF THE INVENTION

This invention relates to optical waveguide grating devices and, more particularly, to such devices with interleaved sampled and chirped gratings which might be especially useful in WDM networks.

In optical waveguide grating devices, the medium of the waveguide through which light signals are transmitted is periodically or nearly periodically modulated to reflect the light signals at particular wavelengths. Though optical waveguides appear in different forms, such as waveguide-bearing substrates, the fiber Bragg grating has been the recent focus of much development. Hence while the present invention is described in terms of fiber Bragg gratings, it should be understood that much, if not all, of the aspects of the present invention are adaptable to other types of optical waveguide grating devices as well.

Fiber Bragg gratings, and other optical waveguide gratings, are key components in many fiberoptic and telecommunications systems. In fiberoptic telecommunications, gratings can be used for many functions, such as filtering, multiplexing/demultiplexing, and gain equalization in broadband WDM (Wavelength Division Multiplexed) systems where the wavelength of an optical signal is used to direct the signal through a network system to its intended destination. The optical signals of a particular wavelength define a communication channel over the network. In advanced WDM network systems, such as DWDM (Dense WDM) systems, the wavelength spacing for communication channels is much tighter, i.e., narrower, so that more channels can used for a given amount of bandwidth in the network, than in standard WDM networks. DWDM wavelength spacing between channels is set at 0.8 nm (100 GHz) and more recent efforts are directed at channel spacings of 0.4 nm (50 GHz). For the purposes of this application, the terms, "WDM" and "WDM networks," are used broadly to include DWDM and DWDM networks unless stated otherwise.

Gratings are furthermore useful in dispersion compensation, especially for long-distance transmissions. The role of such gratings is expected to expand even more as improvements are made in their design and manufacture.

The present invention provides for such improvements in filtering, multiplexing/demultiplexing, and equalization functions for gratings, and even in compensation for second-order signal dispersion.

SUMMARY OF THE INVENTION

The present invention provides for an optical waveguide device comprising a plurality of sampled fiber Bragg gratings which are interleaved together. Each of the sampled fiber Bragg gratings has a grating period which differs from the others so as to produce a predetermined reflection spectrum for the optical waveguide device. By making the sample periods for the fiber Bragg grating different from each other, the resulting reflection spectrum has missing reflection peaks. A bandpass filter can be effectively created.

The present invention further provides for an optical waveguide device comprising a sampled fiber Bragg grating with a grating period which varies discretely at intervals along the optical fiber so as to produce a more uniform reflection spectrum for the optical waveguide device.

Finally, the present invention provides for an optical waveguide grating device comprising a sampled and chirped fiber Bragg grating in an optical fiber. The fiber Bragg grating is sampled by a chirped sampling function. With the optical waveguide device coupled to a transmission optical fiber, the sampling function and the chirp of the sampling function can be selected so that a resulting dispersion slope of the optical waveguide device matches a dispersion slope of the transmission optical fiber so as to compensate for signal dispersion caused by the dispersion slope of the transmission optical fiber.

DESCRIPTION OF THE SPECIFIC EMBODIMENTS

A fiber Bragg grating is formed in an optical fiber in which the refractive index of the light-conducting core is periodically or nearly periodically modulated. Typically, the modulation of the refractive index is symbolically shown as short bars perpendicular to the line representing the optical fiber. A sampled fiber Bragg grating is a grating whose refractive index modulation amplitude (and/or phase) is itself modulated periodically along the structure.

Figure 1A:
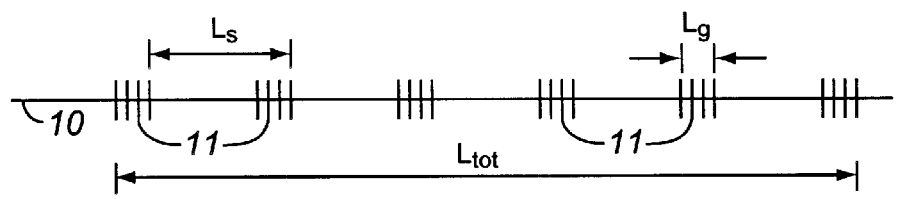
FIG. 1A is a schematic representation of a conventional sampled fiber Bragg grating.
Figure 1B:
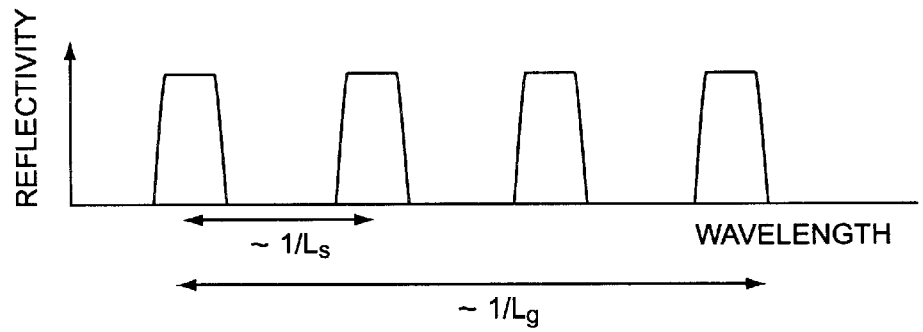
FIG. 1B is a representational reflection response of the FIG. 1A grating in a reflectivity versus wavelength graph.

The basic structure of a conventionally sampled fiber Bragg grating is shown in FIG. 1A. The grating is effectively partitioned into segments 11 of length $L_g$ separated by the sample period $L_s$ along an optical fiber 10. The ratio $L_g/L_s$ is referred to as the duty cycle. In the reflection spectrum, a constant sample period $L_s$, gives rise to multiple reflection peaks with substantially identical characteristics about a central wavelength which is determined by the grating period; whereas the segment length $L_g$ determines the number of reflection peaks, as shown in the graph of FIG. 1B. Each reflection peak determines a communication channel and the number of reflection peaks determines the channel envelope bandwidth. Specifically, $L_s$ is inversely proportional to the resulting channel spacing and $L_g$ is inversely proportional to the number of resulting useful channels.

It might appear that the conventionally sampled fiber Bragg grating is ideally suited for many applications, WDM network applications in particular. Fiber Bragg gratings have very sharp roll-offs in their reflectivity profiles (symbolically indicated by the acute angles of channel shoulders of FIG. 1B). Unfortunately, the conventionally sampled gratings are inadequate for two reasons. To obtain the channel spacing for a DWMD network, say, less than or equal to 0.4 nm (50 GHz), the required refractive index amplitude modulation in the fiber Bragg grating is too large for current manufacturing processes. Secondly, the bandwidth of each channel, as distinguished from the spacing between the channels, becomes too narrow for a useful communication channel.

This can be understood by noting that the coupling coefficient of the nth Fourier component κ(n) of the sample function is given by $$|\kappa(n)|^2 = \left(\kappa_o \frac{L_g \sin \pi n L_g / L_s}{L_s \pi n L_g / L_s}\right)^2$$

and the channel bandwidths by $$\Delta \lambda_{BW}(n) = \frac{\lambda^2}{\pi n_{eff}} \sqrt{|\kappa(n)|^2 + (\pi/L_{tot})^2}$$

where $L_g$ and $L_s$ are respectively the grating segment length and the sample period, as defined above, and $L_{tot}$ is the total length of the grating (see FIG. 1A). It is evident that, even for the strongest component κ(n=0), the coupling coefficient is considerably reduced, compared to the unsampled grating, by a factor equal to the sampling duty cycle $L_g/L_s$. With $L_g$ determined by the number of operating channels and $L_s$ by the channel spacing, the duty cycle for a conventional sampled grating is typically 10% or less. The bandwidth of each reflection peak, i.e., the channel bandwidth, is also correspondingly reduced, rendering it impractical for most applications. Hence the amplitude of the refractive index modulation must be correspondingly large to maintain the coupling with a small sampling duty cycle.

Interleaved Sampled Fiber Bragg Gratings

Figure 2A:
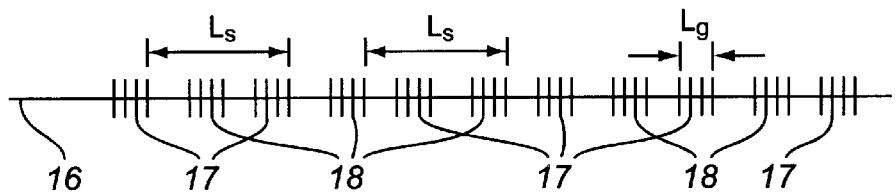
FIG. 2A is a schematic representation of two interleaved sampled gratings, according to an embodiment of the present invention.
Figure 2B:
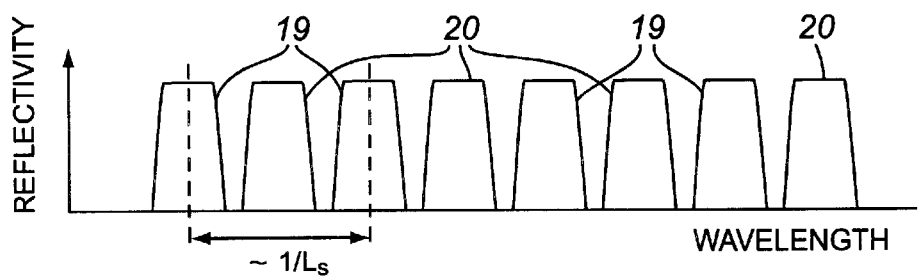
FIG. 2B is a representation of the reflection spectrum of the FIG. 2A interleaved sampled gratings.

The present invention addresses these problems by interleaving a plurality of sampled fiber Bragg gratings with different grating periods. An example of two interleaved fiber Bragg gratings is illustrated in FIG. 2A. In an optical fiber 16, one fiber Bragg grating is shown by grating segments 17 and the other fiber Bragg grating is shown by grating segments 18. The fiber Bragg gratings are interleaved by the alternating placement of the grating segments 17 and 18. Each sampled fiber Bragg grating results in its own reflection spectrum. In the representative plot of FIG. 2B, the fiber Bragg grating with segments 17 gives rise to one set of channel reflection peaks 19 and the fiber Bragg grating with segments 18 gives rise to another set of channel reflection peaks 20.

The interleaved sampled fiber Bragg gratings avoid the necessity of a large amplitude modulation of the refractive index in the optical fiber, which, as explained above, is a consequence of having a low duty cycle, $L_g/L_s$, in the sample function in order to achieve a large number of operating channels spaced closely together. As a result, much of the optical fiber length has no grating segments. Interleaving increases the strength and bandwidth of the individual channels. Interleaving N gratings, for example, enables the sample period of each grating to be reduced by N, resulting in a corresponding increase in the duty cycle.

For optimum performance, each sample function of a grating is physically displaced from the others so that there is no overlap of the gratings. If the gratings do overlap, the interleaved gratings are still operative if the amplitude changes in the refractive index are not too large. For N interleaved gratings, the sample period is chosen such that the associated channel separation is N times the desired channel spacing. Hence as shown in FIG. 2A, the two fiber Bragg gratings have the same sample period, $L_s$, and the same segment length $L_g$, which defines the number of useful channels. The grating period of each sample function differs from its immediate neighbor by the amount corresponding to a channel spacing. The end result is that the interleaved gratings produce a set of interleaved channels in the optical spectrum, with adjacent channels corresponding to adjacent sampled gratings. The refractive index modulation is advantageously reduced by a factor equal to the number of interleaved gratings, e.g., with three interleaved gratings, the refractive index modulation amplitude required is three times lower to produce the same optical performance. Alternatively, if the refractive index modulation is kept the same, three interleaved sampled gratings enables triple the number of useable channels.

Figure 3:
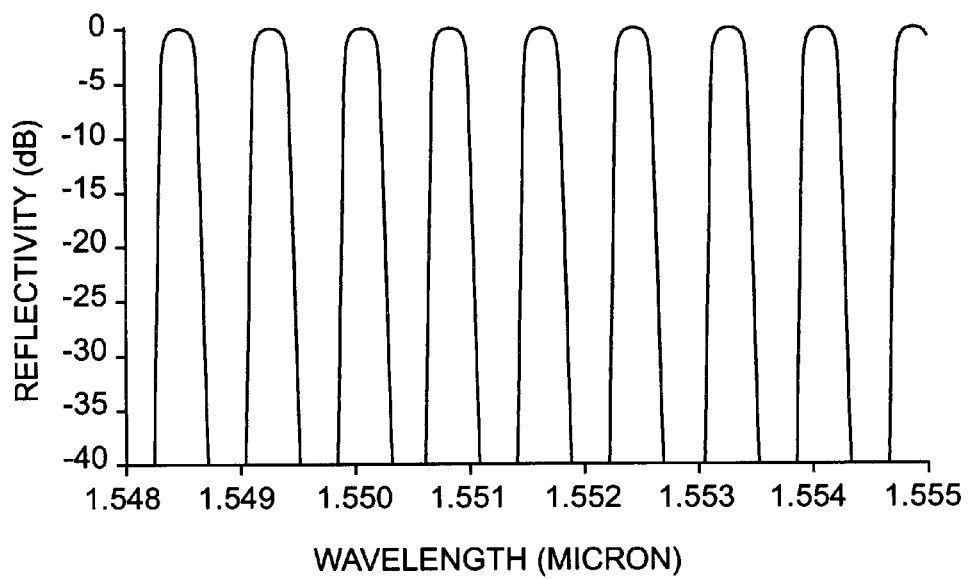
FIG. 3 is a graph showing the reflection spectrum of three exemplary interleaved sampled fiber Bragg gratings.

FIG. 3 shows the reflection spectrum for three interleaved sampled gratings which would be suitable for a WDM network system, for example. The gratings have been apodized with a cosinusoidal profile to suppress the side lobes between the reflection peaks. The device parameters are: grating length 20 mm, sample period 348 μm, duty cycle 33%, refractive index modulation 1×10⁻³, and −1 dB channel bandwidths ≧0.25 nm. In comparison, a non-interleaved sampled grating required to perform the same function suffers not only from low reflectivity, but the channel bandwidths, all less than 0.1 nm, are clearly impractical. Compared to the straightforward approach of concatenating eight individual fiber gratings together to perform the same function, only one 20 mm interleaved sampled grating is required here, giving an 8-fold reduction in size and cost.

Figure 4:
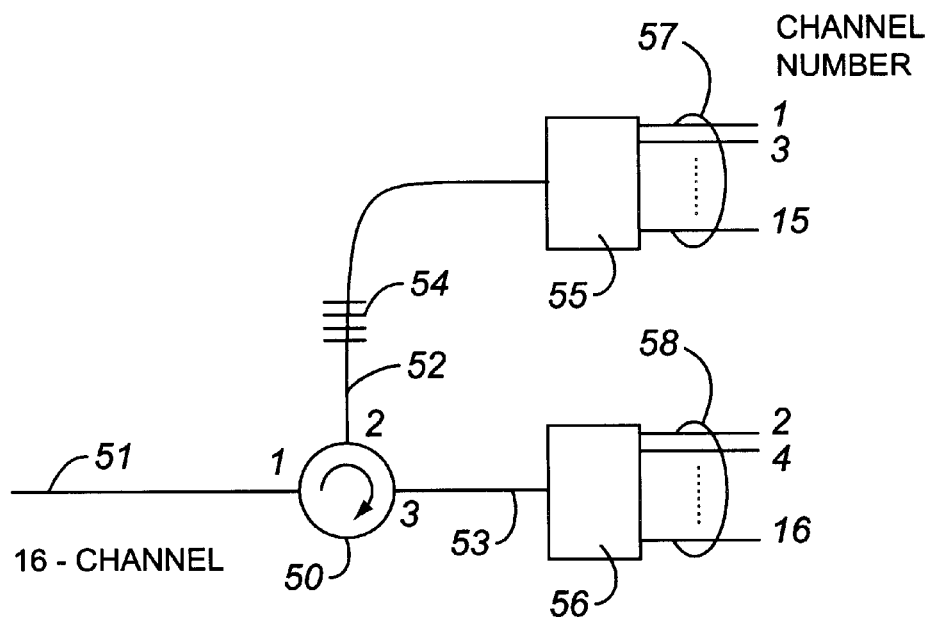
FIG. 4 is a diagram of a WDM multiplexer/demultiplexer having interleaved sampled fiber Bragg gratings to discriminate between signals in closely-spaced channels.

An application of interleaved sampled gratings is a multiplexer/demultiplexer device illustrated in FIG. 4. The device has a three-port optical circulator 50 connected to three optical fibers 51–53, interleaved sampled gratings 54, and two channel multiplexers/demultiplexers 55 and 56 connected to output optical fibers 57 and 58 respectively. In its demultiplexing function, the fiber 51 carries signals in, say, 16 channels spaced 0.4 nm apart to port 1 of the circulator 50. The signals are sent to port 2 and the fiber 52. Here the signals are separated by the interleaved sampled gratings 54, such as those described with respect to FIG. 3, into alternate channels spaced twice as far apart, i.e., 0.8 nm. (It should be noted that fiber Bragg gratings are shown as part of a single optical fiber for purposes of illustration. In actual implementation, it is more likely that fiber Bragg gratings are in an optical fiber segment which has its two ends spliced to optical fibers.) The gratings 54 reflect the signals in the even-numbered, for example, channels back to port 2 and then to port 3 of the circulator 50. The optical fiber 52 carries the signals in the odd-numbered channels to the multiplexer/demultiplexer 55 and the optical fiber 53 carries the signals in the even-numbered channels to the multiplexer/demultiplexer 56. Thin film filters in the multiplexers/demultiplexers 55 and 56 can easily separate the more widely spaced signals into the optical fibers 57 and 58 respectively. In its multiplexing role, the device of FIG. 4 combines signals traveling in the reverse direction so that signals in the optical fibers 57 and 58 carrying signals individual channels are combined on the optical fiber 51.

It should be noted, however, that even though it is desirable that the fiber Bragg gratings be interleaved on the same optical fiber, physically separate sampled fiber Bragg gratings can also be used to achieve interleaving in the optical spectrum. The sampled fiber Bragg gratings can be in separate optical fiber segments and the fiber segments coupled together, such as by concatenation, to provide the required reflection spectrum to signals on a transmission fiber, for example. Fiber Bragg gratings on separate optical fiber segments are particularly useful when the manufacture of the interleaved fiber Bragg gratings on a single optical fiber becomes overly complex or difficult.

Interleaved Sampled Gratings with Different Sample Periods

The present invention also provides for some other unexpected functionalities. Interleaved sampled gratings can be used to select signals of individual channels. By interleaving several sampled gratings with different sample periods, a reflection spectrum can be created having arrays of channels with one channel "missing", thereby forming a grating-based transmission filter, i.e., a bandpass filter. Bandpass filters allow the transmission of light at only selected wavelengths and light at other wavelengths is reflected.

Figure 5A:
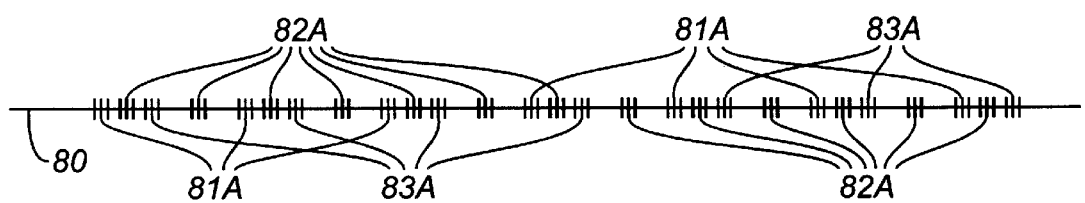
FIG. 5A is a schematic representation of three interleaved sampled gratings with different sample periods, according to another embodiment of the present invention.
Figure 5B:
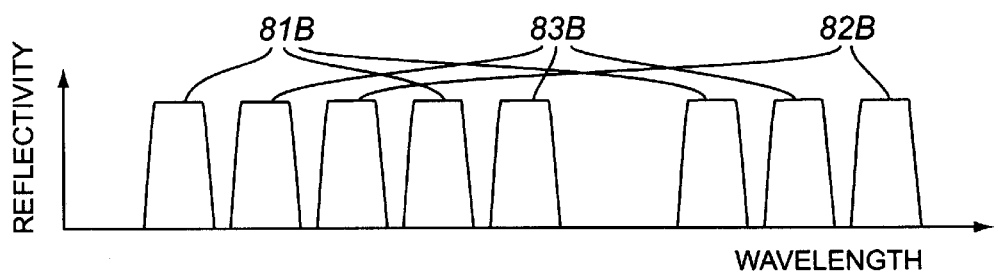
FIG. 5B is a representation of the reflection spectrum of the FIG. 5A interleaved sampled gratings.

FIG. 5A illustrates three interleaved fiber Bragg gratings with different sample periods in an optical fiber 80. One fiber Bragg grating is shown by grating segments 81A, the second fiber Bragg grating by grating segments 82A and the third fiber Bragg grating by grating segments 83A. The fiber Bragg gratings are interleaved by the alternating placement of the grating segments 81A–83A according to the sampling period of each fiber Bragg grating. It should be noted that the sampling periods of the segments 81A and 83A are equal and that of the grating segments 82A is not equal to the other two segments. The sampling period of the segments 82A is one-half that of the two segments 81A and 83A. As explained previously, the grating period of each of the fiber Bragg gratings is also different. Each sampled fiber Bragg grating results in its own reflection spectrum, as shown by the representative plot in FIG. 5B. The fiber Bragg grating with segments 81A generates one set of channel reflection peaks 81B, the fiber Bragg grating with segments 82A generates another set of channel reflection peaks 82B, and the fiber Bragg grating with segments 83A generates a third set of channel reflection peaks 83B. From the different sampling periods of the three fiber Bragg gratings, the resulting reflection spectrum has a gap where one of the channels might be.

Figure 6:
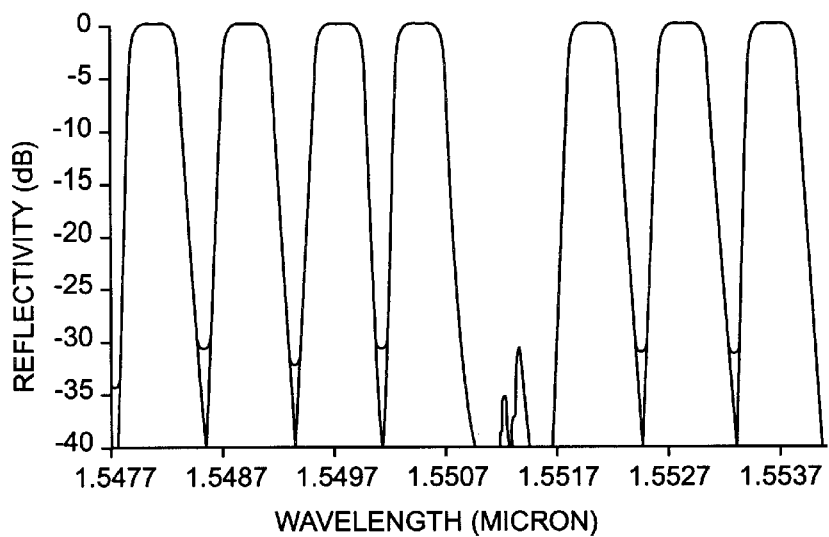
FIG. 6 is a graph showing the reflection spectrum of three exemplary interleaved sampled fiber Bragg gratings with different sample periods.

An actual reflection spectrum of exemplary interleaved fiber Bragg gratings with different sample periods is plotted in FIG. 6. Two of the three interleaved sample functions have sample periods of 348 $\mu$m, while the third has a period of 174 $\mu$m. It is not difficult to see that halving the period for the third function enables the production of a "missing" channel in the spectrum. The other parameters include: grating length 50 mm, refractive index modulation $5\times10^{-4}$, and −1 dB channel bandwidths ≧0.37 nm.

Figure 7A:
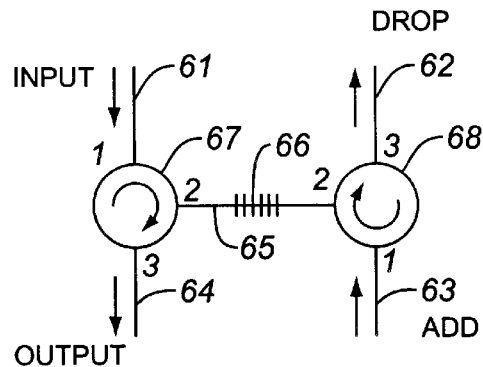
FIG. 7A is a diagram of an exemplary WDM add/drop multiplexer using interleaved sampled fiber Bragg gratings with different sample periods.
Figure 7B:
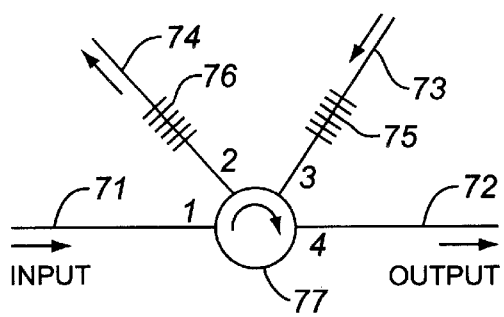
FIG. 7B is a diagram of another WDM add/drop multiplexer using interleaved sampled fiber Bragg gratings with different sample periods.

Such interleaved fiber Bragg gratings can be used to create WDM devices, such as add/drop multiplexers. FIGS. 7A and 7B show two such add/drop multiplexers. In the FIG. 7A device, two optical circulators 67 and 68 are connected at their port 2 by an optical fiber 65 with interleaved fiber Bragg gratings 66. The different sample periods of the gratings 66 are determined according to the particular channel(s) of the WDM network which is(are) to be dropped or added. Optical fiber 61 connected to port 1 of the circulator 67 corresponds to the network input fiber which carries the signals of all the channels of the WDM network into the add/drop multiplexer. These signals are passed to port 2 and all the signals, except those of the selected channel(s), are reflected back to port 2 to pass on to port 3. Optical fiber 64 connected to port 2 corresponds to the network output fiber which carries the signals of all the channels of the WDM network away from the add/drop multiplexer.

The signals which are passed by the interleaved fiber Bragg gratings 66 reach port 2 of the optical circulator 68 which passes these signals to port 3. Optical fiber 62 connected to port 2 corresponds to the drop fiber which is connected to a user terminal which communicates with the WDM network over the selected channel(s). The user terminal adds signals to the WDM network by optical fiber 63 which is connected to port 1 of the circulator 68. Signals received at port 1 pass to port 2 and the fiber Bragg gratings 66. Being at the wavelengths of the selected channel(s), the signals pass the gratings 66 into port 2 of the circulator 67 which passes the signals to port 3 and the optical fiber 64.

Compared to the FIG. 7A device, the add/drop multiplexer of FIG. 7B requires only one 4-port circulator. The network input fiber 71 is connected to port 1 of the circulator 77, the drop fiber 74 to port 2, the add fiber 73 to port 3 and the network output fiber 72. Both the drop fiber 74 and add fiber 73 have interleaved fiber Bragg gratings 76 and 75 respectively. The interleaved fiber Bragg gratings 76 and 75 are matched and have their gratings with different sample periods determined for the particular channel(s) of the WDM network which is(are) to be dropped or added.

Figure 8A:
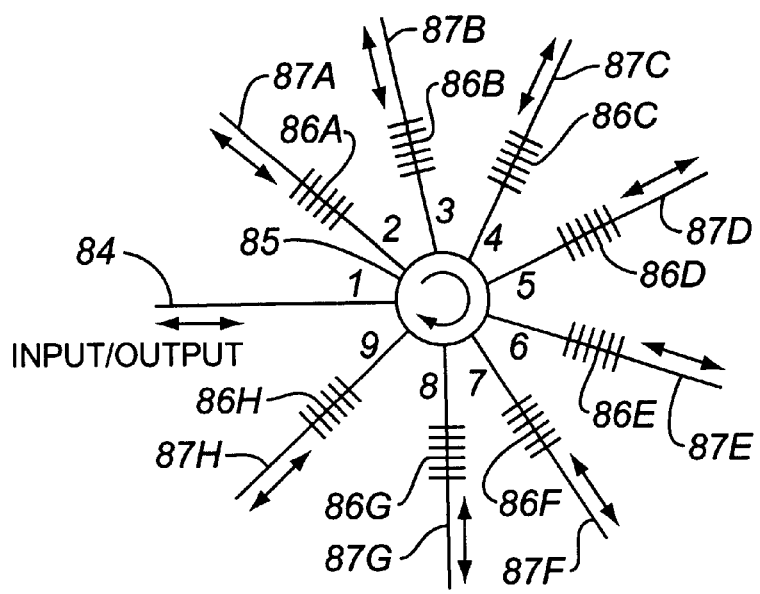
FIG. 8A is a diagram of an exemplary 1×8 WDM multiplexer/demultiplexer which uses interleaved sampled fiber Bragg gratings with different sample periods.

The present invention permits the construction of multiplexers/demultiplexers based just on fiber Bragg gratings alone, i.e., without the use of thin film filters, such as found in the device of FIG. 4. With the new sampled grating-based transmission filter approach, one nine-port circulator 85 can be used to separate or combine the signals of eight channels, as shown in FIG. 8A. An input/output optical fiber 84 which carries all the channels is connected to port 1 of the circulator 85. The eight individual channel fibers 87A–87H are connected to ports 2–9 of the circulator 85. Each of the fibers 87A–87H has interleaved sampled gratings 86A–86H respectively with sample periods determined to pass only signals of the particular channel of the fiber 87A–87H. The device of FIG. 8A operates as multiplexer when signals travel from the individual channel fibers 87A–87H to the optical fiber 84 and as a demultiplexer when signals from the optical fiber 84 are separated into the channel fibers 87A–87H.

Figure 8B:
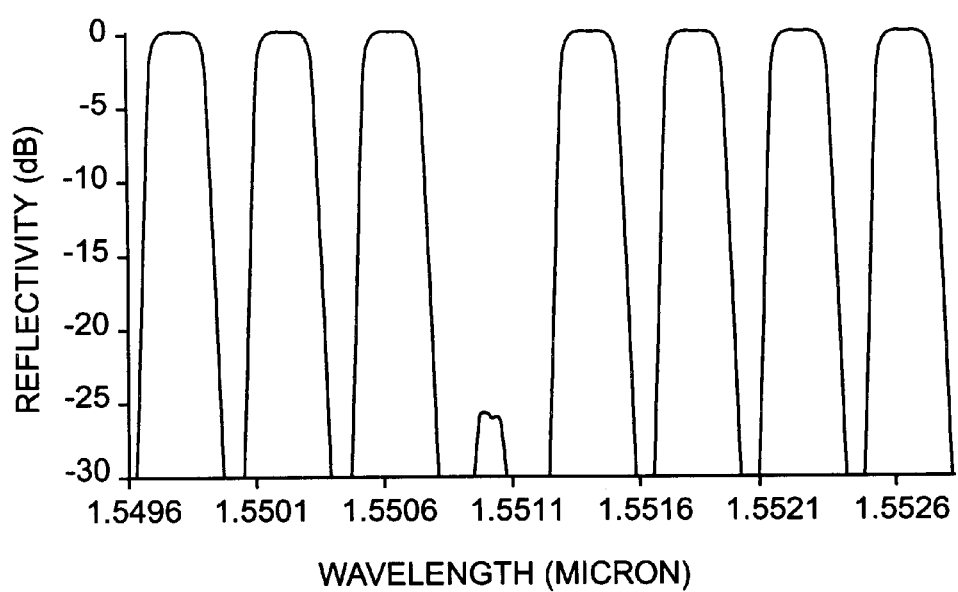
FIG. 8B is a graph showing the reflection spectrum of exemplary interleaved sampled fiber Bragg gratings with different sampled periods which might be used in the FIG. 8A multiplexer/demultiplexer.

FIG. 8B shows the characteristics of one of the interleaved sampled gratings, designed to drop the fourth channel in a 50 GHz DWDM system. The grating interleaves 3 sample functions, and has a total grating length of 20 mm. The refractive index modulation required is $8 \times 10^{-4}$, and the resultant –1 dB channel bandwidths $\geq 0.17$ nm.

It is should be noted that a conventional approach based on conventional fiber gratings, operates by dropping channels on reflection. Such a conventional device would require seven three-port optical circulators to multiplex/demultiplex eight channels and make such designs prohibitively expensive and bulky.

Discrete Variation of Grating Periods at Intervals

Another aspect of the present invention provides for the improvement in the uniformity of the optical spectrum by discrete increasing (or decreasing) the period of the grating, at regular intervals along the device length, by the equivalent of one (or more) channel spacings. In this manner, the reflection peaks of the fiber Bragg gratings coincide, but the center wavelength of the optical spectrum envelope is shifted, resulting in an averaging of the envelope shape. This produces a broader, flatter and more uniform spectrum.

Figure 9:
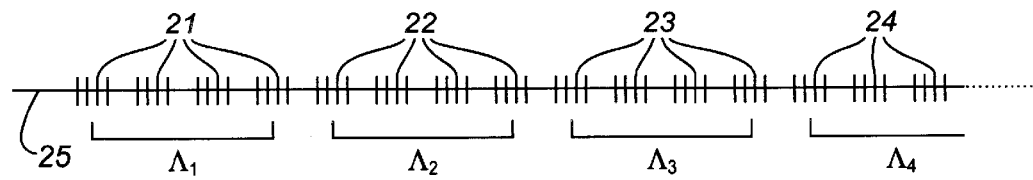
FIG. 9 is a schematic representation of a sampled grating where the grating period is changed by a channel spacing at regular intervals along the sampled grating length, according to another embodiment of the present invention.
Figure 10A:
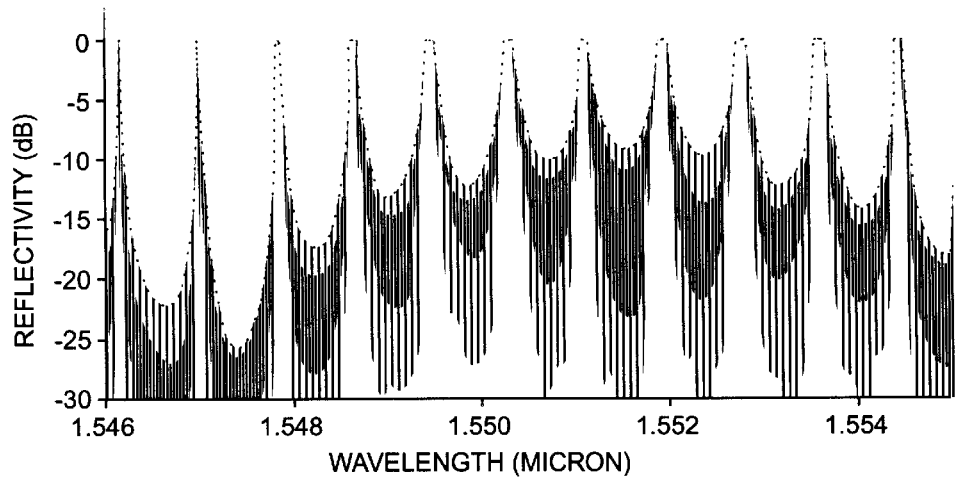
FIG. 10A is a graph showing the reflection spectrum of an exemplary fiber Bragg grating as represented by FIG. 9.
Figure 10B:
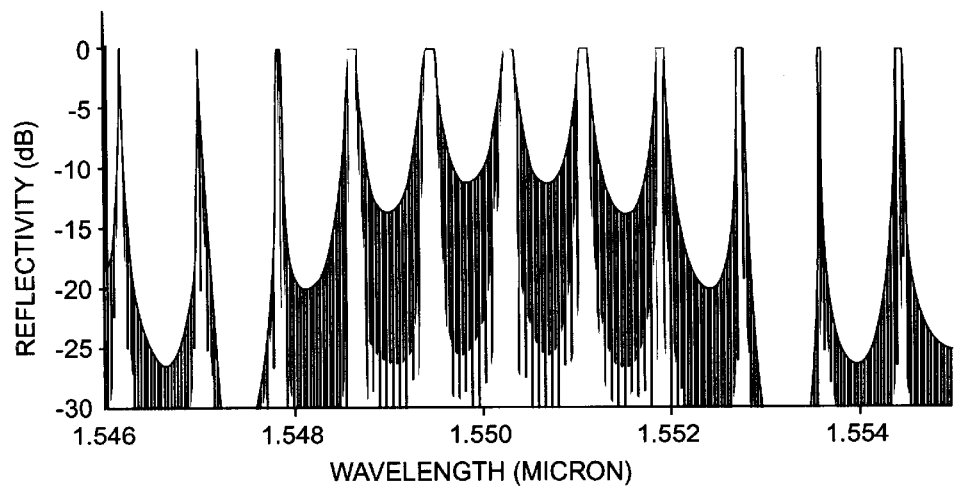
FIG. 10B is a graph showing the reflection spectrum of a exemplary grating with the same parameters as that in FIG. 10A, but without any changes in the grating period.

FIG. 9 shows the schematic of a sampled grating where the grating period (denoted by $\Lambda_i$) is changed by a channel spacing at regular intervals along the device length. In the representation of FIG. 9, the grating segments 21 correspond to grating period $\Lambda_1$, grating segments 22 correspond to grating period $\Lambda_2$, grating segments 23 correspond to grating period $\Lambda_3$, and grating segments 24 correspond to grating period $\Lambda_4$ in an optical fiber 25. Each grating period change causes the center wavelength of the reflection spectrum (channel envelope) to shift by a channel spacing. This produces an averaging effect on the overall spectrum, enhancing its uniformity. As an example of this effect, FIG. 10A shows the reflection spectrum of a uniform sampled grating where the grating period has been shifted 4 times along the length. By comparison, FIG. 10B shows the spectrum of a similar sampled grating without the period shifts. It is clear that the bandwidths of the channels in the middle of the spectrum have a greater uniformity with the period shifting. For both these gratings, the grating length is 100 mm, sample period 1 mm, duty cycle 28%, refractive index modulation $5 \times 10^{-4}$; for the grating of FIG. 9, the grating period is shifted by a channel spacing every 25 mm.

Compensation for Dispersion Slope

Up to now, the present invention has disclosed the benefits of sampled fiber Bragg gratings and variations in the sampling functions. The present invention also provides for dispersion compensation in optical fibers by varying the chirp in fiber Bragg gratings.

Light signals at different wavelengths travel at different speeds in optical fibers and the resulting dispersion of an optical signal after traveling through an optical fiber can seriously affect the integrity of the signal unless the dispersion has been compensated for. Less attention has been focussed on compensating the dispersion slope (the variation of dispersion with wavelength), as it has heretofore been viewed as a second order effect. However, with the introduction of new transmission fibers (e.g., the Corning® LEAF™ and Lucent® Truewave™ optical fibers) which are optimized for wideband WDM systems, the impact of dispersion slope should become increasingly significant. With these new fibers, the dispersion slope is two or more times greater than that of the conventional single mode fiber (e.g., the Corning® SMF-28™ fiber). Therefore, as the deployment of these new optical fibers progresses, the need for a cost-effective dispersion slope compensator should increase correspondingly.

Presently, the main solutions for dispersion slope compensation are the dispersion compensating fiber and the chirped fiber Bragg gratings. In the case of fiber Bragg gratings, the approach proposed thus far imposes a nonlinear chirp function on the grating. However, this requires accurate control of the grating fabrication process over a long grating length to cover a useful bandwidth range. These two requirements are particularly difficult to satisfy simultaneously.

Sampled gratings appear as an attractive alternative, as they seem suited to multi-channel operation in a short device and dispersion compensation has been demonstrated with a sampled fiber grating, but without dispersion slope compensation. However, investigations of sampled gratings have invariably emphasized identical channel behavior. Secondly, with sampled gratings a large refractive index modulation is needed in order to realize a large number of channels with the desired characteristics, as explained above.

In accordance with the present invention, different channels have different dispersion values associated with them to enable dispersion slope compensation. This is achieved by using an aperiodic sample function for a fiber Bragg grating. That is, $L_s$ is a varying function of the distance along the optical fiber. For the common case of a constant dispersion slope, a simple, linearly chirped sample function suffices. In other words, both the grating and the sample function are chirped. The chirp in the grating provides the dispersion D (and therefore a means for compensating for dispersion in a transmission fiber), and the chirp in the sampling function generates different dispersion values for different channels, i.e., the dispersion slope. Quantitatively, the chirp to the sample function in this case is governed by the simple equation:

$$\frac{\Delta L_s}{L_s} = \frac{1}{D} \frac{\Delta D}{\Delta \lambda} \cdot \Delta \lambda_{BW}$$

where $\Delta L_s / L_s$ is the fractional change in the sample period $L_s$ over the device length, D the dispersion, $\Delta D / \Delta \lambda$ the dispersion slope, and $\Delta \lambda_{BW}$ is the bandwidth of the channel. With the correct choice of sample chirp, the desired dispersion slope can be obtained.

Figure 11:
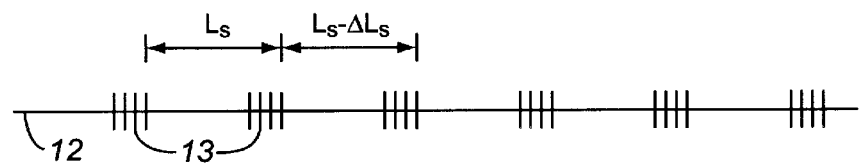
FIG. 11 is a representation of a chirped fiber Bragg grating having a chirped sampling function, according to one embodiment of the present invention.
Figure 12A:
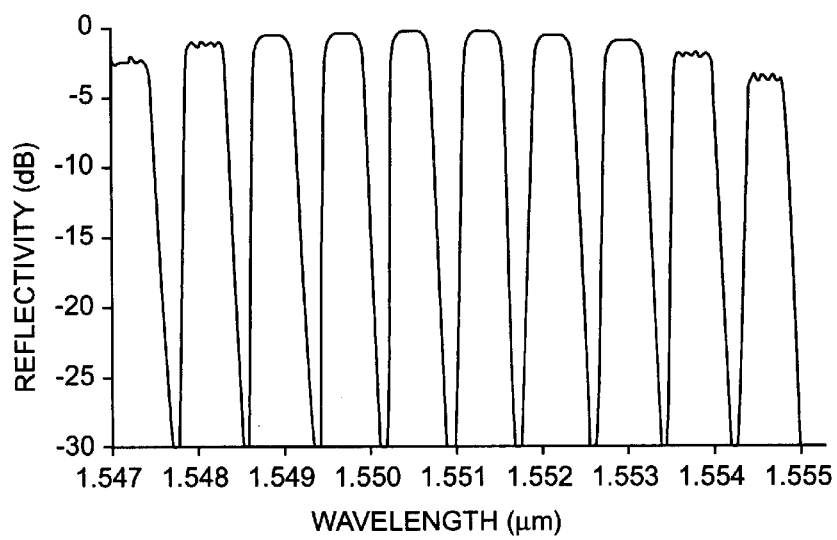
FIG. 12A is a reflection spectrum of an exemplary chirped fiber Bragg grating with a chirped sampling function.
Figure 12B:
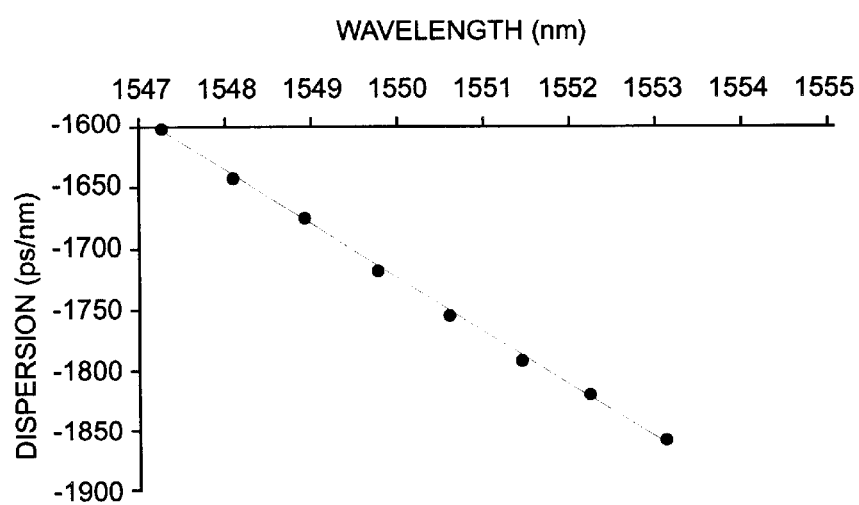
FIG. 12B is a plot of the dispersion versus wavelength for the fiber Bragg grating of FIG. 12A.

FIG. 11 represents such a fiber Bragg grating with such a sampling function. With the grating length at 10 cm. grating chip 0.02 nm/cm, sample period 1 mm, sample chirp 1.5%, grating segment length $L_g$ 120 $\mu$m and the UV-induced grating index modulation is $10^{-3}$, the average dispersion of 1725 ps/nm (at 1550 nm) corresponds to 400 km of LEAF optical fiber. The results are plotted in the graph of FIG. 12B. The reflection spectrum of the sampled fiber Bragg grating is illustrated in FIG. 12A. By selecting the appropriate sample chirp, other fibers types can be matched to compensate for their dispersion slopes.

Furthermore, gratings which are sampled and interleaved according to the present invention can be combined with the described features for dispersion and dispersion slope compensation. For example, the sampled interleaved gratings in the previously described devices, such the add/drop WDM multiplexers of FIGS. 7A and 7B, can be chirped for dispersion compensation. The sampling functions can also be chirped so that the dispersion slopes of the various channels are compensated for.

Figure 13A:
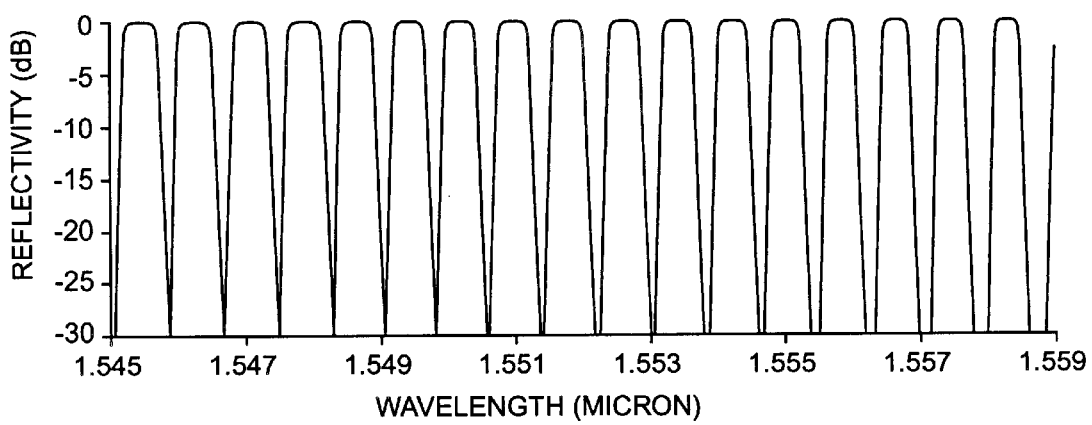
FIG. 13A is a graph showing the reflection spectrum of three exemplary interleaved sampled fiber Bragg gratings.
Figure 13B:
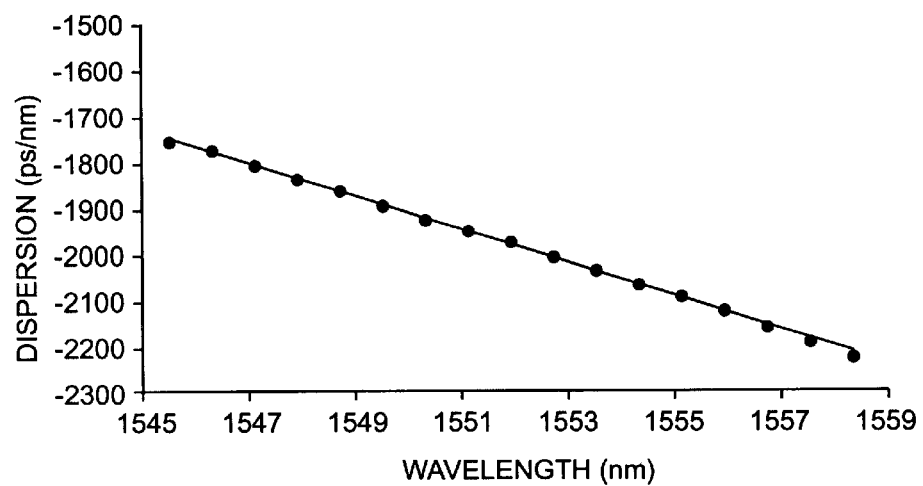
FIG. 13B is a graph showing the dispersion characteristics of the FIG. 13A interleaved gratings.
Figure 13C:
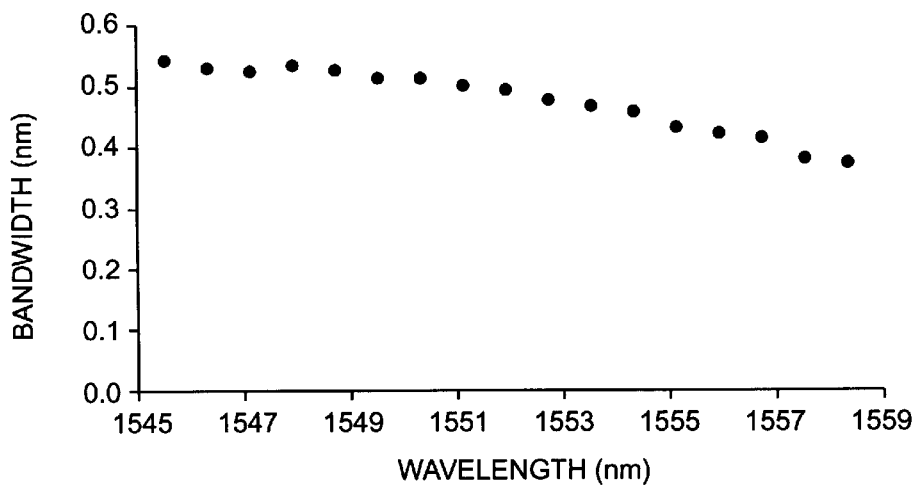
FIG. 13C is a graph showing the resulting bandwidths of the channels versus wavelength of the FIG. 13A interleaved grating.

This compensation is illustrated in the optical characteristics of three interleaved fiber Bragg gratings in FIGS. 13A–13C. In this example, the three interleaved gratings are used to generate a 16-channel device, as explained previously. The grating periods and the sampling functions are also sloped to compensate for dispersion and dispersion slope for each channel. The device parameters are: device length 100 mm, grating chirp rate 0.01 nm/cm, sample period 348 μm, sample chirp 1.5%, duty cycle 16%. The refractive index modulation required is $7.5 \times 10^{-4}$. The dispersion and the dispersion slope are shown in FIG. 13B. The RDS, the relative dispersion slope defined as the dispersion slope divided by the dispersion, of this device is 0.0266 $nm^{-1}$, which again is a good match to that of the Corning® LEAF™ transmission fiber. The bandwidth variation of the channels with wavelength is shown in FIG. 13C. The bandwidth decreases with increasing wavelength, in inverse relation to the dispersion, from 0.37 nm to 0.52 nm. This range is within acceptable limits for current 100 GHz channel spacing for DWDM systems.

Figure 14A:
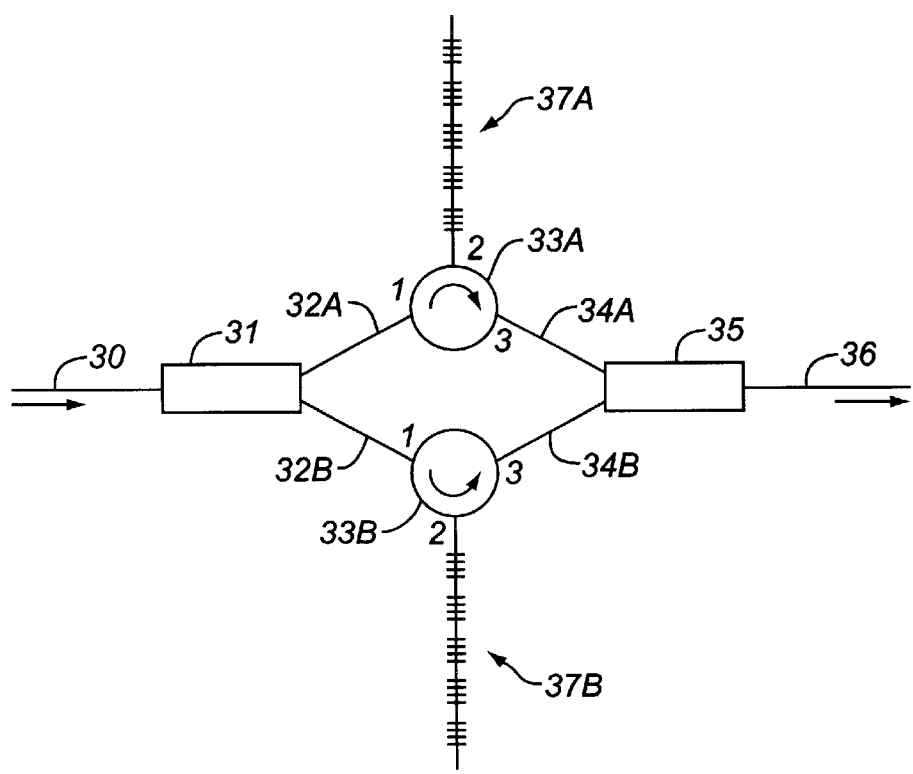
FIGS. 14A–14C show typical arrangements in which the fiber Bragg grating device of the present invention may be advantageously deployed in multi-channel systems.
Figure 14B:
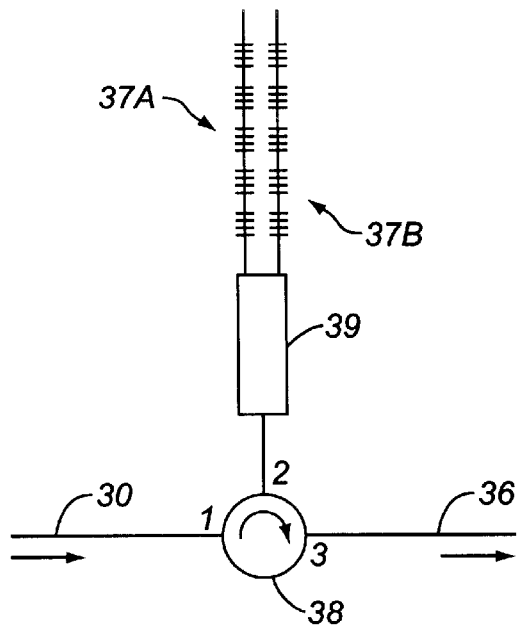
Figure 14C:
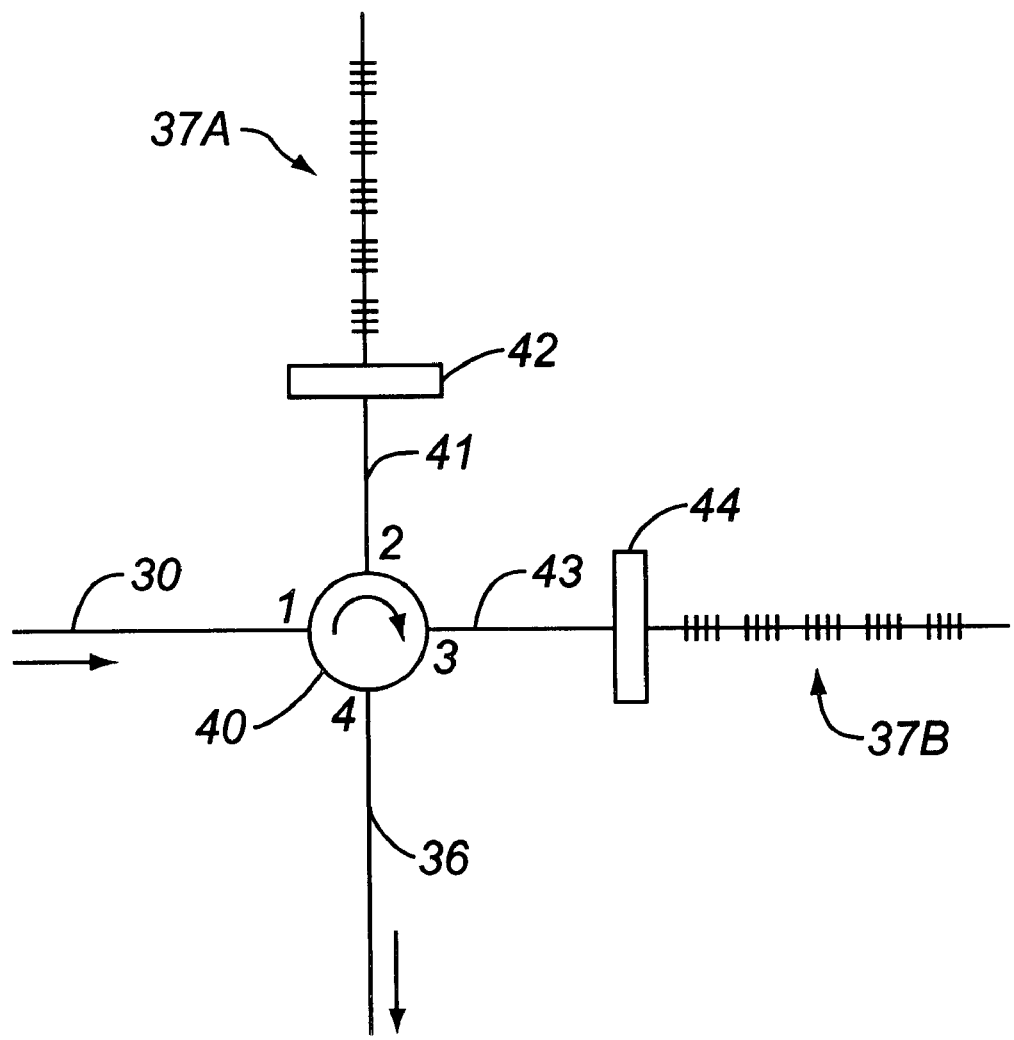

FIGS. 14A–14C illustrate arrangements where the sampled gratings described above can be utilized in an optical transmission system for dispersion compensation. Only two sampled gratings are used in each arrangement, but the arrangements can be easily extended for N sampled gratings. In FIG. 14A, an input fiber 30 from the optical system carries optical signals for 2N channels into a channel band separator 31 which splits the signals into upper and lower channels. The upper channels are sent by an optical fiber 32A to port 1 of a three-port optical circulator 33A. The N upper channel signals are routed to a sampled fiber Bragg grating 37A which is connected to port 2 of the optical circulator 33A. The sampled grating 37A is matched to the N upper channels as explained above, and the reflected N channel signals are passed to port 3 of the circulator 33A and a connected optical fiber 34A. Likewise, the N lower channel signals are routed to port 1 of a three-port optical circulator 33B by an fiber 32B. The N lower channel signals are routed to a sampled grating 37B which is connected to port 2 of the optical circulator 33B. The sampled grating 37B is matched to the N lower channels and the reflected N channel signals are passed to port 3 of the circulator 33B and a connected optical fiber 34B. The upper and lower channel signals are recombined by a channel band combiner 35 before returns the combined signals to the optical system by an output fiber 36.

FIG. 14B illustrates a variation of the FIG. 14A arrangement. In this arrangement, only one circulator and channel band separator/combiner is needed. The 2N channel signals on the input fiber 30 are received at port 1 of an optical circulator 38 which sends the signals to port 2 and a channel band separator/combiner 39. The device 39 separates the 2N channel signals into the N upper channel signals and N lower channel signals. The upper and lower channel signals are sent to the upper channel and lower channel sampled fiber Bragg gratings 37A and 37B respectively. The reflected signals are combined by the device 39 and returned to port 2 of the circulator 38 which passes the combined 2N channel signals to port 3 and the output fiber 36.

FIG. 14C illustrates an arrangement which uses bandpass filters to separate the incoming channel signals. As before, the input fiber 30 carries 2N channel signals from the optical system. The incoming signals are received at port 1 of a four-port optical circulator 40. The signals pass through port 2 of the circulator 40 on an optical fiber 41 which is connected to a first bandpass filter 42. In this example, the bandpass filter 41 passes the signals of the upper N channels and reflects the lower N channel signals back to port 2. The upper channel signals are received by the sampled fiber Bragg grating 37A which, as described above, are matched to the upper N channels. The upper N channel signals are reflected back by the grating 37A through the first bandpass filter 42 to port 2. Both upper and lower channel signals are passed from port 2 to port 3 of the circulator 40. A connected optical fiber 43 carries the signals to a second bandpass filter 44 which passes the signals of the lower N channels to the sampled fiber Bragg grating 37B and reflects the upper N channel signals back to port 3. Matched to the lower N channels, the grating 37B reflects the lower N channel signals back through the bandpass filter 44 to port 3. From port 3 the signals of the upper and lower channels pass to port 4 and the output fiber 36.

Hence the advantages of the various aspects of the present invention should be evident. The small size, performance and low costs of these optical waveguide gratings have been described and only some of the applications of the present invention have been explained.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An optical waveguide grating device comprising
   a plurality of sampled waveguide gratings, each of said sampled waveguide gratings having a grating period, each grating period differing from the others so to produce a predetermined reflection spectrum for said optical waveguide device.

2. The optical waveguide grating device of claim 1 wherein each grating period differing from the others by an amount corresponding to a channel spacing in said reflection spectrum.

3. The optical waveguide grating device of claim 2 wherein said sampled waveguide gratings are interleaved together in an optical fiber.

4. The optical waveguide grating device of claim 3 wherein said sampled waveguide gratings are interleaved with no overlap in said optical fiber.

5. The optical waveguide grating device of claim 2 wherein said sampled waveguide gratings are in a plurality of coupled optical fibers.

6. The optical waveguide grating device of claim 5 wherein said coupled optical fibers are concatenated.

7. In an optical network having a plurality of defined wavelength channels having defined channel spacings therebetween, an optical waveguide grating device comprising
   an optical fiber; and
   a first sampled fiber Bragg grating in said optical fiber, said first fiber Bragg grating has a grating period;

a second sampled fiber Bragg grating in said optical fiber, said second fiber Bragg grating interleaved with said first fiber Bragg grating, said second fiber Bragg grating having a grating period differing from that of said first fiber Bragg grating by an amount corresponding to a channel spacing in an optical spectrum of said optical waveguide device.

8. The optical waveguide grating device of claim 7 further comprising a third sampled fiber Bragg grating, said third fiber Bragg grating interleaved with said first and second fiber Bragg gratings, said third fiber Bragg grating having a grating period differing from that of said second fiber Bragg grating by an amount corresponding to a channel spacing in said optical spectrum of said optical waveguide device.

9. The optical waveguide grating device of claim 7 wherein said first and second fiber Bragg gratings are chirped so that signal dispersion of said optical waveguide device matches that of a transmission optical fiber in said optical network so as to compensate for dispersion of signals over said transmission optical fiber.

10. The optical waveguide grating device of claim 9 wherein said first and second fiber Bragg gratings each has a sampling function which is chirped so that a dispersion slope of said optical waveguide device matches that of a transmission optical fiber in said optical network so as to compensate for dispersion of signals over said transmission optical fiber due to said dispersion slope of said transmission optical fiber.

11. An optical waveguide grating device comprising
a plurality of sampled waveguide gratings, each of said sampled waveguide gratings having a sampling period, at least one of said waveguide gratings having a sampling period different from that of other waveguide gratings so that a reflection channel peak is missing in an optical spectrum of said optical waveguide grating device.

12. The optical waveguide grating device of claim 11 wherein each sampled waveguide grating has a grating period, each grating period differing from the others by an amount corresponding to a channel spacing in said optical spectrum.

13. The optical waveguide grating device of claim 12 wherein said sampled waveguide gratings are interleaved together in an optical fiber.

14. The optical waveguide grating device of claim 13 wherein said sampled waveguide gratings are interleaved with no overlap in said optical fiber.

15. The optical waveguide grating device of claim 12 wherein said sampled waveguide gratings are in a plurality of optical fibers.

16. The optical waveguide grating device of claim 15 wherein said optical fibers are concatenated.

17. In an optical network having a plurality of defined wavelength channels having defined channel spacings therebetween, an optical waveguide grating device comprising
a first sampled fiber Bragg grating in said optical fiber, said first fiber Bragg grating having a first sampling period; and
a second sampled fiber Bragg grating in said optical fiber, said second fiber Bragg grating having a second sampling period from said first sampling period so that a reflection channel peak is missing in an optical spectrum of said optical waveguide grating device.

18. The optical waveguide grating device of claim 17 wherein said first sampled fiber Bragg grating has a grating period differing from that of said second fiber Bragg grating by an amount corresponding to a channel spacing in a reflection spectrum of said optical waveguide device.

19. The optical waveguide grating device of claim 18 wherein said first and second fiber Bragg gratings are interleaved in said optical fiber.

20. The optical waveguide grating device of claim 19 wherein said first and second fiber Bragg gratings are interleaved with no overlap in said optical fiber.

21. The optical waveguide grating device of claim 17 wherein said first and second fiber Bragg gratings are chirped so that signal dispersion of said optical waveguide device matches that of a transmission optical fiber in said optical network so as to compensate for dispersion of signals over said transmission optical fiber.

22. The optical waveguide grating device of claim 21 wherein said first and second fiber Bragg gratings each has a sampling function which is chirped so that a dispersion slope of said optical waveguide device matches that of a transmission optical fiber in said optical network so as to compensate for dispersion of signals over said transmission optical fiber due to said dispersion slope of said transmission optical fiber.

23. An optical waveguide grating device comprising
a plurality of sampled waveguide gratings, each sampled waveguide grating having a grating period varying from a grating period of the other sampled waveguide gratings by an amount corresponding to a multiple of a channel spacing in an optical spectrum of said optical waveguide grating device to produce a more uniform optical spectrum for said optical waveguide grating device.

24. The optical waveguide grating device of claim 23 wherein said sampled waveguide gratings are aligned linearly with each other, said grating period of each waveguide grating varying by said amount at discrete intervals.

25. The optical waveguide grating device of claim 24 wherein said grating period of each waveguide grating increases along said linear alignment.

26. The optical waveguide grating device of claim 24 wherein said grating period of each waveguide grating decreases along said linear alignment.

27. The optical waveguide grating device of claim 24 wherein said grating period of each sampled waveguide grating varies by an amount corresponding to one channel spacing from a grating period of its neighboring grating.

28. An optical waveguide grating device comprising
an optical fiber; and
a plurality of sampled fiber Bragg gratings on said optical fiber, each fiber Bragg grating having a grating period varying discretely from the grating period of the other fiber Bragg gratings at intervals along said optical fiber so as to produce a more uniform optical spectrum for said optical waveguide grating device.

29. The optical waveguide device of claim 28 wherein said grating period of each fiber Bragg grating increases discretely at regular intervals along said optical fiber.

30. The optical waveguide grating device of claim 29 wherein said grating period increases by an amount corresponding to one channel spacing in said optical spectrum.

31. The optical waveguide grating device of claim 28 wherein said grating period of each fiber Bragg grating decreases discretely at regular intervals along said optical fiber.

32. The optical waveguide grating device of claim 31 wherein said grating period decreases by an amount corresponding to one channel spacing in said optical spectrum.

33. An optical waveguide grating device coupled to a transmission fiber, said optical waveguide grating device comprising a first sampled grating, said grating sampled by a chirped sampling function so that a resulting dispersion slope of said optical waveguide grating device matches a dispersion slope of said transmission fiber so that said device compensates for said transmission fiber dispersion slope.

34. The optical waveguide grating device of claim 33 wherein said first sampled grating has a chirped grating period, said chirped grating period matching a dispersion of said transmission fiber to compensate for said transmission fiber dispersion.

35. The optical waveguide grating device of claim 33 further comprising a second sampled grating joined with said first sampled grating, said second grating sampled by a sampling function which is chirped to match said transmission fiber dispersion slope.

36. The optical waveguide grating device of claim 35 wherein said second sampled grating is interleaved with said first sampled grating.

37. The optical waveguide grating device of claim 35 further comprising at least a third sampled grating joined with said first and second sampled gratings, said third grating sampled by a sampling function which is chirped to match said transmission fiber dispersion slope.

38. The optical waveguide grating device of claim 37 wherein said third sampled grating is interleaved with said first and second sampled gratings.

39. An optical waveguide grating device coupled to a transmission fiber comprising an optical fiber; and a first sampled fiber Bragg grating in said optical fiber, said first fiber Bragg grating sampled by a chirped sampling function so that a resulting dispersion slope of said optical waveguide grating device matches a dispersion slope of said transmission fiber to compensate for said transmission fiber dispersion slope.

40. The optical waveguide grating device of claim 39 wherein said first sampled fiber Bragg grating has a chirped grating period, said chirped grating period matching a dispersion of said transmission fiber to compensate for said transmission fiber dispersion.

41. The optical waveguide device of claim 40 further comprising a second sampled and chirped fiber Bragg grating in said optical fiber, said second fiber Bragg grating sampled by a sampling function which is chirped.

42. The optical waveguide device of claim 41 wherein said second fiber Bragg grating is interleaved with said first Bragg grating in said optical fiber.

43. The optical waveguide grating device of claim 41 further comprising at least a third sampled and chirped fiber Bragg grating in said optical fiber, said third fiber Bragg grating sampled by a sampling function which is chirped.

44. The optical waveguide grating device of claim 43 wherein said third fiber Bragg grating is interleaved with said first and second fiber Bragg gratings.

* * * * *